United States Patent
Fukatsu

[11] 3,707,879
[45] Jan. 2, 1973

[54] FLUID PRESSURE PULSATION ABSORBERS

[75] Inventor: Kazuyoshi Fukatsu, Kariya, Japan

[73] Assignee: Toyoda Kaki Kabushiki Kaisha, Kariya-shi, Japan

[22] Filed: June 22, 1970

[21] Appl. No.: 48,338

[52] U.S. Cl.....................92/48, 92/98 R, 92/103
[51] Int. Cl..................................F01b 19/00
[58] Field of Search.........92/103, 103 M, 98, 99, 48, 92/49, 97; 73/407

[56] References Cited

UNITED STATES PATENTS

| | | | |
|---|---|---|---|
| 684,806 | 10/1901 | Enzinger | 92/60 X |
| 2,544,289 | 3/1951 | Andrews | 138/30 X |
| 3,149,576 | 9/1964 | Russell | 417/542 |
| 3,250,224 | 5/1966 | Phillips | 417/542 X |
| 3,424,091 | 1/1969 | Turner | 417/542 X |
| 1,888,322 | 11/1932 | Lanctot et al. | 92/103 X |
| 2,598,180 | 5/1952 | Kenyon | 92/97 X |
| 2,646,063 | 7/1953 | Hayes | 92/103 |
| 2,879,802 | 3/1959 | Du Bois | 92/97 X |
| 2,999,385 | 9/1961 | Wolfe | 73/407 X |
| 3,029,743 | 4/1962 | Johns | 92/103 X |
| 3,093,086 | 6/1963 | Altoz et al. | 92/103 M |
| 3,367,575 | 2/1968 | Davis | 92/103 |

Primary Examiner—Martin P. Schwadron
Assistant Examiner—R. H. Lazarus
Attorney—Wenderoth, Lind and Ponack

[57] ABSTRACT

In a fluid pressure pulsation absorber, a disc spring shaped diaphragm is disposed in a casing to receive pressurized fluid on one side and the pheriphery of the diaphragm is clamped between annular resilient members. The annular resilient members are made of a resilient material having smaller spring constant than the diaphragm so that pulsations of lower frequencies are absorbed by the resilent members and pulsations of higher frequencies are absorbed by the diaphragm.

6 Claims, 8 Drawing Figures

PATENTED JAN 2 1973 3,707,879

KAZUYOSHI FUKATSU,
INVENTOR

BY Wenderoth Lind & Ponack
ATTORNEYS

A: NO ABSORBER.
B: PRIOR ART ACCUMULATOR
C: ABSORBER UTILIZING A DIAPHRAGM, 1.5mm THICK.
D: ABSORBER UTILIZING A DIAPHRAGM, 2.0mm THICK.

KAZUYOSHI FUKATSU,
INVENTOR

BY Wendroth Lind & Ponack
ATTORNEYs

FLUID PRESSURE PULSATION ABSORBERS

BACKGROUND OF THE INVENTION

This invention relates to an absorber of pulsations in fluid pressure utilized to operate a fluid actuator and more particularly to an absorber of pulsations or surge in the pressurized oil for driving a power steering device, for example.

As is well known in the art, since an oil pressure pump repeats oil suction-discharge cycles by the volumetric change in the pump casing the pressure of the oil discharged from the pump pulsates cyclically. Such pulsations of the oil pressure cause a number of problems including noise, vibration, damage to the oil pressure apparatus, decrease of the operating life thereof due to abnormal wear, miss operation of the control and the like.

For example where a tool feed cylinder of a machine tool is operated by pulsating pressurized oil, a knocking phenomenon will result when a fine feed is applied to the tool post thus causing to be unstable the fine feed speed of the tool post to greatly degrade the finishing accuracy of a workpiece. Further, when a power steering device is driven by pulsating pressurized oil, pulsations are transmitted to the power steering device, especially a steering wheel thus giving an unpleasant feeling to the operator and causing rough operation of the power steering device.

Further shocks in oil pressure created at the time of switching the operation of oil pressure apparatus result in instantaneous pressure surges and such pressure surges decrease the accuracy of the finished workpiece or in the case of power steering device, cause non-smooth operation.

To obviate these difficulties, it has been the practice to provide an accumulator on the output side of an oil pump which utilizes a bladder containing compressed air or compressibility of a coil spring. With these means although it is possible to eliminate pulsations of low frequencies which are produced when the oil pump is operating at a relatively low speed, as shown by curve B in FIG. 4, it is impossible to eliminate pulsations of higher frequencies produced when the oil pump is operating at higher speeds (from 500 to 6,000 r.p.m.) for operating machine tools or power steering devices. Moreover these prior art accumulators have poor pulsation absorbing efficiency and are difficult to manufacture to have a compact and small size.

SUMMARY OF THE INVENTION

It is therefore an object of this invention to provide a novel fluid pressure pulsation absorber according to which low frequency pulsations or surges of a pressurized fluid are absorbed principally by the flexure of resilient members disposed on both sides of a diaphragm whereas high frequency pulsations are absorbed by the flexure of the diaphragm so as to prevent pulsations and surges of the pressurized fluid from being transmitting to the fluid actuator, thus assuring highly accurate operation thereof.

Another object of this invention is provide an improved fluid pressure pulsation absorber especially suitable to effectively eliminate pulsations or surges of pressurized oil for operating a power steering device thus improving the operating characteristic and steering sensitivity thereof.

A further object of this invention is to provide a novel fluid pressure pulsation absorber having excellent responsiveness as well as high absorbing efficiency and extremely simple construction and can be manufactured as a small and compact unit.

Still further object of this invention is to provide an improved pulsation absorber which can eliminate difficulties of the above described prior art pulsation absorbers.

According to this invention, between a casing and its cover there are interposed one or more diaphragms in the form of disc springs designed to have a pressure receiving area and thickness enough to respond to pulsations and pressure surges of higher frequencies of the pressurized fluid and the opposite sides of the periphery of the diaphragms are clamped between resilient members capable of responding to pulsations and surges of lower frequencies of the pressurized fluid. The diaphragm is supported in the casing by the cover with its peripheral portion clamped between the resilient members to define a chamber on one side of the diaphragm to receive the pressurized fluid, and an air chamber on the opposite side which is vented to the atmosphere, whereby to absorb pulsations and surges of higher frequency mainly by the flexure of the diaphragm and to absorb lower frequency pulsations by the resilient members.

BRIEF DESCRIPTION OF THE DRAWINGS

Further objects and advantages of this invention will become apparent from the following detailed description taken in conjunction with the accompanying drawings in which.

DESCRIPTION OF THE PREFERRED EMBODIMENTS

Figure 1:
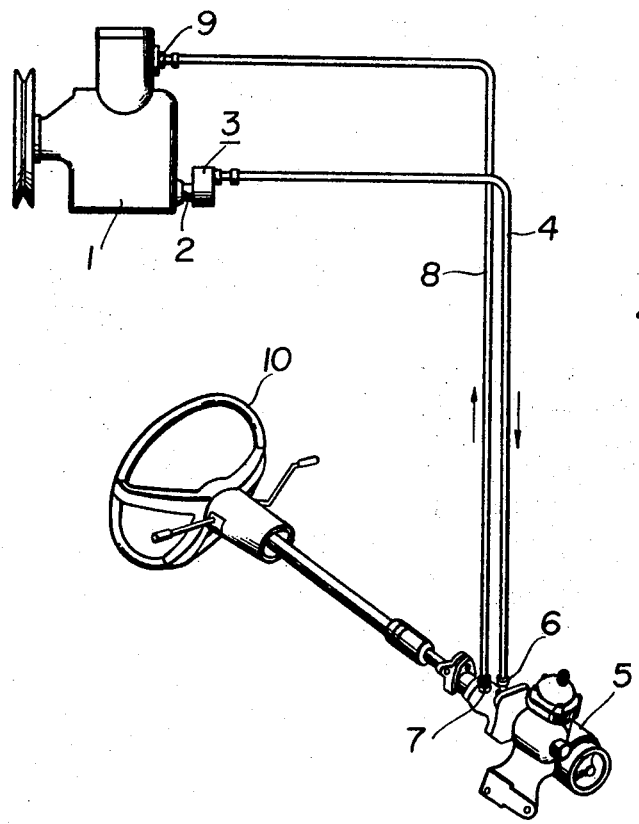
FIG. 1 is a diagrammatic representation of the novel absorber as applied to an oil pump utilized to operate a power steering device.
Figure 3:
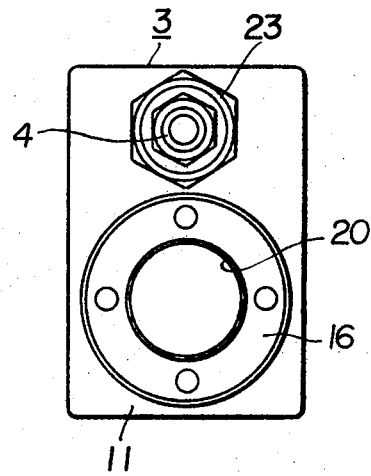
FIG. 3 is a side elevation of the absorber shown in FIG. 2 as viewed in the direction of an arrow III.

With reference first to FIG. 1 of the accompanying drawing, one application of the novel fluid pressure pulsation absorber will be described. As shown, the novel pulsation absorber 3 is connected to the discharge port 2 of an oil pump 1. The pulsation absorber 3 is connected to an inlet port 6 of a power steering device 5 via a pipe line 4 to supply to the power steering device the pressurized operating oil from which pulsations of the pressure have been removed by the pulsation absorber 3. The discharge port 7 of automatic steering device 5 is connected to an oil tank 9 provided for pump 1 through a pipe line 8 to return the operating pressurized oil exhausted from discharge port 7 back to the oil tank 9. Thus, the power steering device is operated by the operating oil under constant pressure thus eliminating vibration of the steering wheel 10 as well as unpleasant feeling to the operator whereby smooth operation of the power steering device can be assured.

Figure 2:
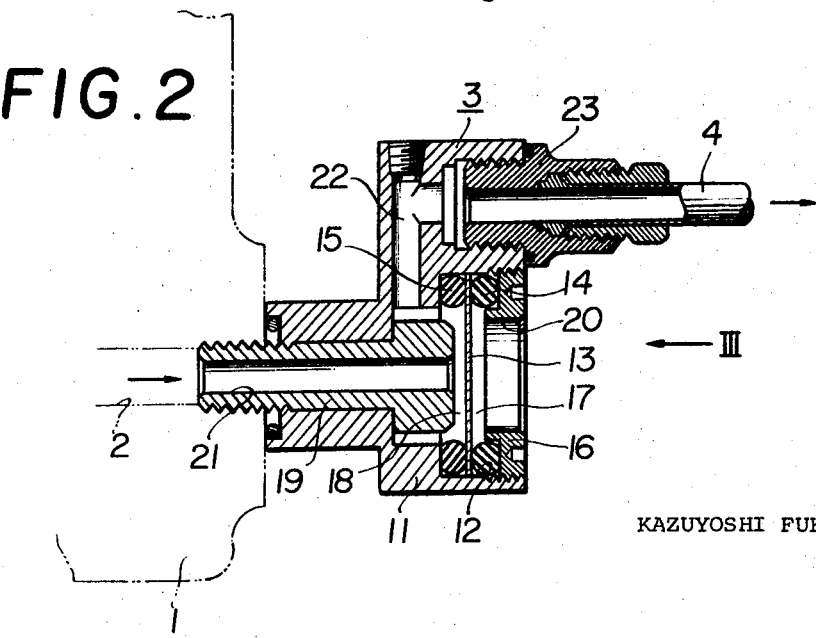
FIG. 2 is a sectional view of one embodiment of this invention.

FIG. 2 shows one example of the fluid pressure pulsation absorber 3 constructed according to the principle of this invention. The absorber 3 comprises a casing 11 connected to discharge port 2 of oil pump 1 by means of a hollow bolt 19, the casing 11 being provided with a recess 12 of a large diameter. A diaphragm 13 in the form of a disc spring having a predetermined spring constant is disposed in the recess 12. The diameter and thickness of the diaphragm are selected to minimize the amplitude of the pulsation or the pressure surge. The peripheral portion of diaphragm 13 is clamped between resilient rings 14 and 15 made of a flexible material such as rubber or a synthetic resin having a smaller spring constant than the material of the diaphragm 13. The diaphragm is contained in the recess 12 of casing 11 by a cover 16 threaded into the opening of recess 12 with its peripheral portion clamped between resilient rings 14 and 15. Diaphragm 13 defines an air chamber 17 on one side thereof and a fluid chamber 18 to receive pressurized fluid on the other side. Air chamber 17 is communicated with the atmosphere through a vent opening 20 extending through the cover 16, while the fluid chamber 18 is communicated with the discharge port 2 of the oil pump 1 through a bore 21 extending through bolt 19. Further, the fluid chamber 18 is communicated with one end of a passage 22 in casing 11 and the other end of passage 22 is communicated with inlet port 6 of power steering device 5 via a coupling 23 and pipe line 4, as shown in FIG. 1.

In operation, when a pulsating pressurized oil is admitted into fluid chamber 18 from the oil pump 1 via bore 21 in bolt 19, resilient ring 14, 15 and diaphragm 13 will be compressed or flexed in accordance with the pressure pulsation of the pressurized oil to absorb such pulsation. More particularly, pulsations of lower frequencies are absorbed by the flexure of the resilient rings 14 and 15 having a low spring constant whereas the pulsations of higher frequencies are absorbed by the flexure of the diaphragm 13 having a higher spring constant. In this manner, the novel fluid pressure pulsation absorber 3 effectively absorbs all pulsations in a wide frequency range contained in the pressurized oil or operating fluid discharged from oil pump 1. For example, where the pressurized oil is used to actuate the power steering device 5 it is possible to operate smoothly the same without creating any vibration. Further, the pulsation absorber 3 can also absorb the pressure surge momentarily generated in the operating pressurized oil caused by the shock in the pressurized oil when the oil pressure device is switched.

Figure 4:
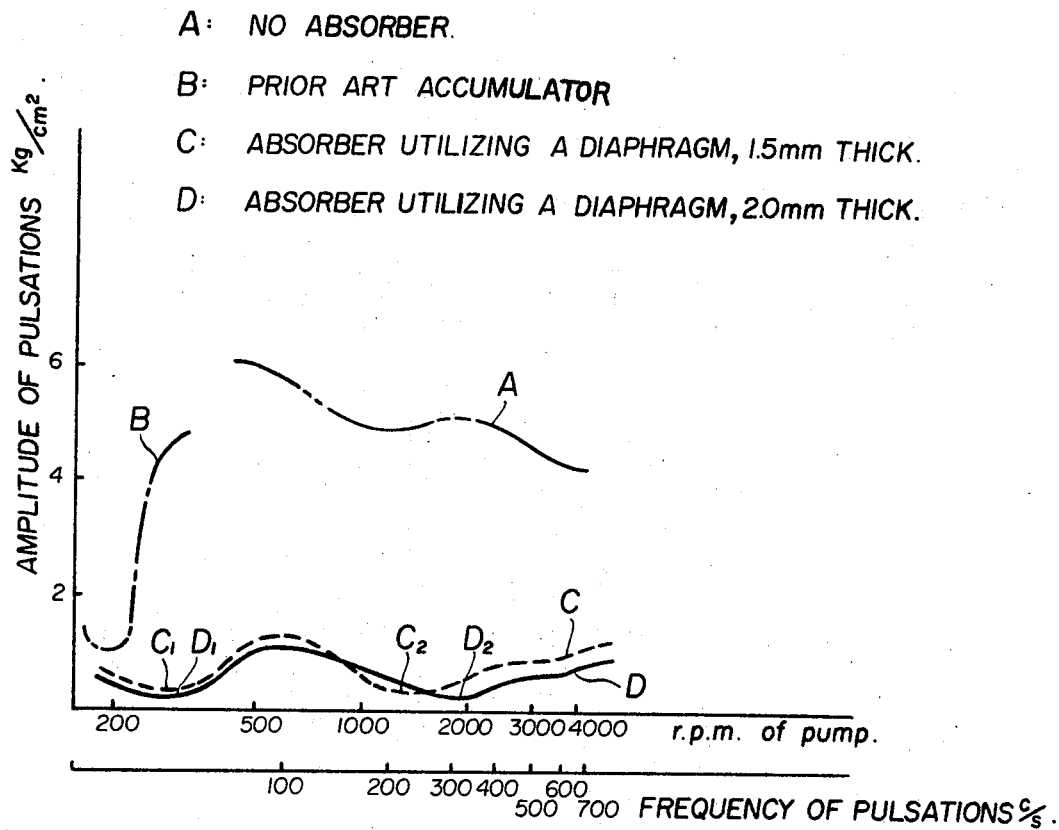
FIG. 4 shows characteristic curves of the fluid pressure pulsation absorber shown in FIG. 2.

FIG. 4 shows a set of characteristic curves showing operating characteristics of the absorber shown in FIG. 2. In the absence of the absorber near the outlet port 2 of the pump 1 the pressure fluctuates with a large amplitude with the amplitude increasing as the number of revolutions of the pump decrease, as shown in curve A. Curves C and D show the amplitudes of pulsations where absorbers 3 are connected to the outlet port 2 utilizing diaphragms having thicknesses of 1.5 mm and 2.0 mm respectively and the same diameter. As can be noted from these curves when the absorber is used, the amplitude of the pulsation is decreased to less than about one-third of that when the absorber is not used. In curve C, at a point $C_1$ in the lower frequency range and at a point $C_2$ in the higher frequency range the amplitude of the pulsation is minimum. Similarly in curve D, there are points $D_1$ and $D_2$ of the minimum amplitude near points $C_1$ and $C_2$. It is considered that pulsations of lower frequencies near points $C_1$ and $D_1$ are absorbed mainly by resilient rings 14 and 15 and that pulsations of higher frequencies near points $C_2$ and $D_2$ are absorbed mainly by the flexure of diaphragm 13. It is to be understood that the spring constants of the resilient rings and the diaphragm are selected so as to effectively absorb pulsations in the pressurized oil at the outlet port of the pump and the pressure surge created when the oil pressure device is switched.

Figure 5:
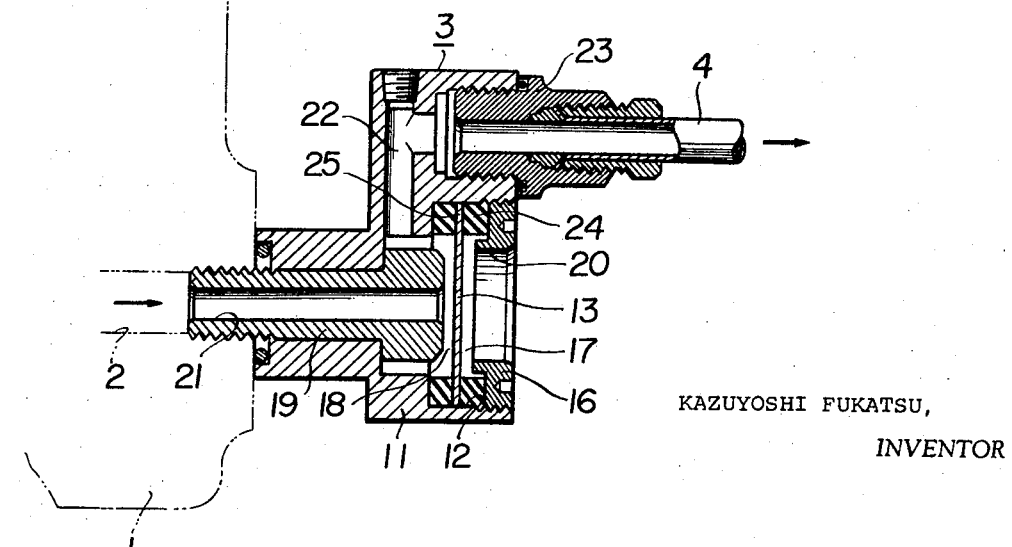
FIGS. 5, 6 and 7 are sectional views of another embodiment of this invention

In the modified embodiment shown in FIG. 5 the periphery of diaphragm 13 is embedded in an annular groove 25 substantially at the center of a resilient ring 24 made of a flexible material having a smaller spring constant than the diaphragm 13, such as rubber or a synthetic resin, for example. The annular ring 24 is held in the recess 12 of casing 11 by cover 16. Again the low frequency pulsations and low frequency pressure surges of the pressurized oil are absorbed by the flexure of the resilient ring 24 and the high frequency pulsations are absorbed by the flexure of the diaphragm 13.

Figure 6:
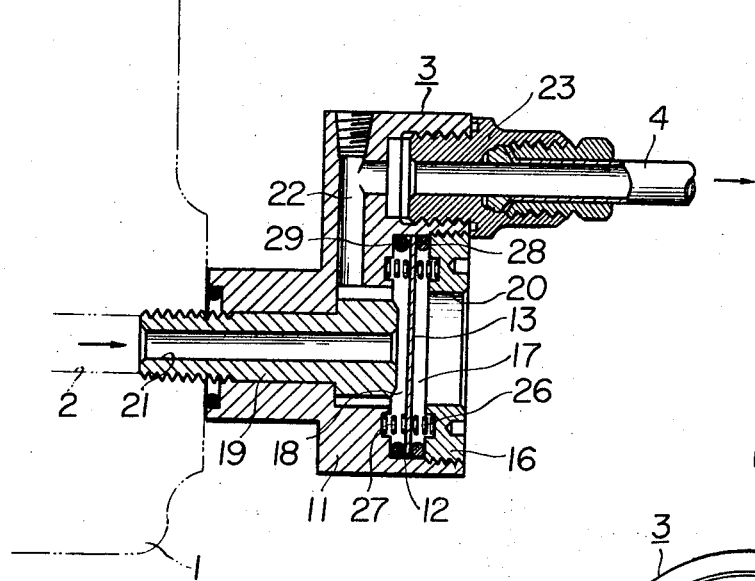

In another modified embodiment shown in FIG. 6 the periphery of the diaphragm 13 is clamped between a plurality of small coil springs 26 and 27 which are interposed between the diaphragm and the casing 11 and cover 16 at equal spacings and having a smaller spring constant than the diaphragm. The outer periphery of the diaphragm is sandwiched between O-rings 28 and 29 for oil seal. In the modified embodiment shown in FIG. 6 low frequency pulsations are absorbed by the flexure of coil springs whereas the high frequency pulsations are absorbed by the flexure of the diaphragm.

Figure 8:
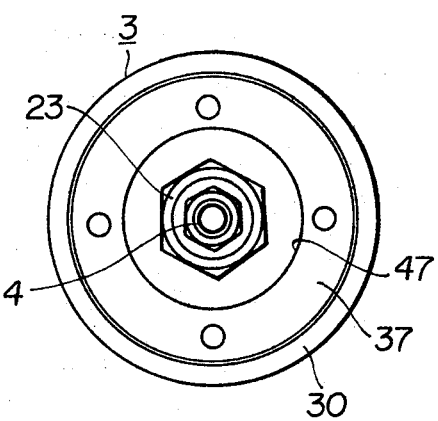
FIG. 8 is a side elevation of the absorber shown in FIG. 7 as viewed in the direction of an arrow VIII.
Figure 7:
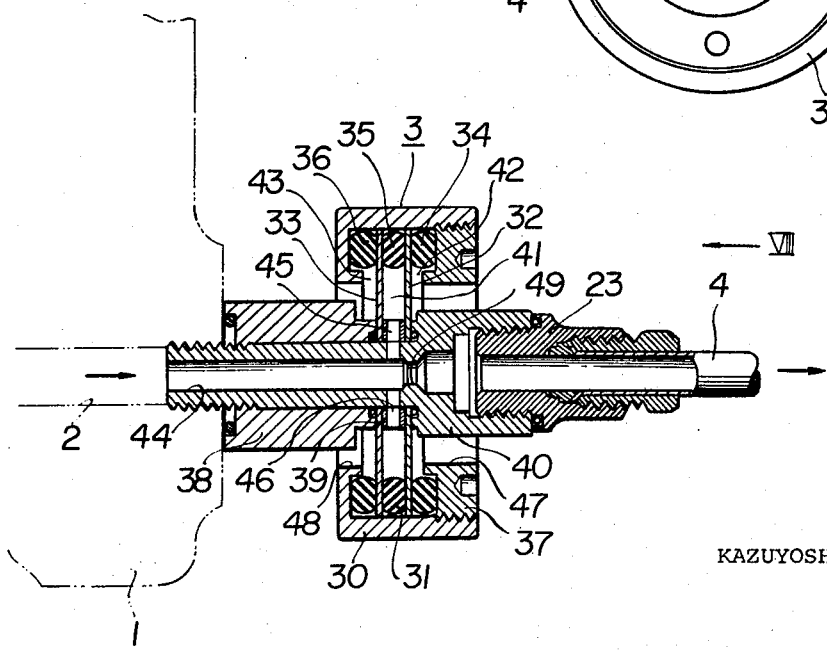

Another embodiment shown in FIGS. 7 and 8 is identical to that shown in FIG. 2 except that two diaphragms are used. More particularly, two spaced apart parallel diaphragms 32 and 33 in the form of disc springs of a predetermined spring constant are received in a recess 31 of a casing 30. Outer peripheries of the diaphragms are sandwiched between resilient rings 34, 35 and 36 made of a flexible material having a smaller spring constant than that of the diaphragms 32 and 33, such as rubber or a synthetic resin, for example. The diaphragms and resilient rings are held in position by a cover 37 threaded in the opening of the recess 31. The central portions of diaphragms 32 and 33 are clamped between a supporting sleeve 38 and a spacer 39 by means of a hollow bolt 40 to define a fluid chamber 41 between diaphragms 32 and 33 and air chambers 42 and 43 outside the diaphragms. The fluid chamber 41 is communicated with the discharge port 2 of pump 1 through passages 44, 45 and 46 whereas air chambers 42 and 43 are communicated with the atmosphere through vent holes 47 and 48. The fluid chamber 41 is also communicated with the inlet port 6 of the power steering device 5 (FIG. 1) through a reduced diameter portion 49, a coupling 23 and a piping 4.

In the embodiment shown in FIG. 7 when pulsating pressurized oil discharged by pump 1 enters into fluid chamber 41 through passages 44, 45 and 46 resilient rings 34, 35 and 36 and diaphragms 32 and 33 flex in response to the pressure pulsations so as to absorb pulsations of lower frequencies mainly by the flexure of the former having a lower spring constant and to absorb pulsations of higher frequencies mainly by the flexure of the latter having a higher spring constant. The reduced diameter portion 49 also functions to absorb pressure surges and pulsations of the pressurized oil passing therethrough. Thus the embodiment shown in FIG. 7 is more effective than previous embodiments.

Thus it will be clear that this invention provides an effective fluid pressure pulsation absorber comprising at least one diaphragm in the form of a disc spring, the pressure receiving area and thickness thereof being selected to be responsive to pulsations and pressure surges of higher frequencies and resilient members disposed on the opposite sides of the periphery of the diaphragm and made of resilient material responsive to pulsations and pressure surges of lower frequencies whereby to effectively absorb pulsations and pressure surges of the pressurized liquid in a wide frequency range with a single absorber. Moreover, since the periphery of the diaphragm is sandwiched between resilient ring shaped members both the diaphragm and resilient members can flex in response to pulsations and surges over a wide frequency range thus improving the efficiency of the absorber. This greatly simplifies the construction of the circuit of the pressurized fluid and reduces the space occupied thereby when compared with a prior art absorber wherein a plurality of accumulators of different spring constant are included in the circuit of the pressurized fluid.

While the invention has been shown and described in terms of preferred embodiments as applied to the power steering device it will be clear that this invention is not limited to this particular application and that many changes and modifications may be made without departing from the true spirit and scope of the invention as defined in the appended claims.

What is claimed is:

1. A fluid pressure pulsation absorber for absorbing fluid pressure pulsations caused by a pressure fluid supply source comprising a casing having a recess, at least one diaphragm means for absorbing said fluid pressure pulsations, said diaphragm being in the form of a uniform thickness spring and being disposed in said recess to divide said recess into two chambers, resilient member means to resiliently support the opposite sides of said diaphragm means for absorbing said fluid pressure pulsations, a cover member threadedly engaged with said casing to hold said diaphragm means and said resilient member means in said recess in superposed relationship, one end of said cover being exposed to the outside of said casing, one of said chambers of said recess having an inlet port connected to said pressure fluid supply source, said inlet port being at right angles with said diaphragm means, an outlet port for pressurized fluid, said diaphragm means having the property of being flexed in response to the pressure pulsation of the pressurized fluid from said source, and the other chamber of said recess being exposed to the atmosphere, said resilient member means having a smaller spring constant than said diaphragm means, whereby fluid pressure pulsations of relatively low frequencies are absorbed principally by the flexure of said resilient member means, and fluid pressure pulsations of relatively higher frequencies are absorbed principally by the flexure of said diaphragm means.

2. The fluid pressure pulsation absorber according to claim 1 wherein said resilient member means are made of a high molecular weight material such as rubber and synthetic resin.

3. The fluid pressure pulsation absorber according to claim 1 wherein said resilient member means comprises springs.

4. The fluid pressure pulsation absorber according to claim 1 wherein said resilient member means comprise a plurality coil springs disposed on the opposite sides of said diaphragm means.

5. The fluid pressure pulsation absorber according to claim 1 wherein two parallel diaphragms are disposed in said recess and said diaphragms are sandwiched between annular resilient members and said one chamber communicating with said inlet port is defined between said diaphragms.

6. The fluid pressure pulsation absorber according to claim 1, wherein said inlet port has at one end thereof an enlarged face parallel to said diaphragm.

* * * * *